(12) United States Patent
Zhou et al.

(10) Patent No.: US 8,990,492 B1
(45) Date of Patent: Mar. 24, 2015

(54) INCREASING CAPACITY IN ROUTER FORWARDING TABLES

(75) Inventors: Junlan Zhou, Sunnyvale, CA (US);
Zhengrong Ji, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 939 days.

(21) Appl. No.: 13/166,145

(22) Filed: Jun. 22, 2011

(51) Int. Cl.
*G06F 12/00* (2006.01)
*H04L 12/741* (2013.01)
*G06F 17/00* (2006.01)

(52) U.S. Cl.
CPC ............... *H04L 45/54* (2013.01); *G06F 17/00* (2013.01)
USPC .................... 711/108; 711/105; 711/E12.001

(58) Field of Classification Search
CPC ................................ G06F 17/00; H04L 45/54
USPC .................... 711/105, 108, E12.001
See application file for complete search history.

(56) References Cited

U.S. PATENT DOCUMENTS

| 6,718,326 | B2 * | 4/2004 | Uga et al. ............................. 1/1 |
| 2011/0038375 | A1 * | 2/2011 | Liu et al. ........................ 370/392 |

\* cited by examiner

*Primary Examiner* — Pierre-Michel Bataille
(74) *Attorney, Agent, or Firm* — Lerner, David, Littenberg, Krumholz & Mentlik, LLP

(57) ABSTRACT

Aspects of the disclosure provide for increasing the capacity of ternary content addressable memories (TCAMs). For example, one aspect provides a method for adding rules to a TCAM, wherein the TCAM comprises multiple configurable banks. According to this method, a range of candidate banks in which the proposed rule may be stored is identified based on a priority of the proposed rule, and one of the candidate banks is selected for storing the proposed rule based on a width of the proposed rule and widths of the candidate banks. Another aspect provides a method for deleting one or more rules from a TCAM comprising multiple configurable banks. According to this method, once the rule is deleted, the bank from which it was deleted may be reduced in width, and therefore increased in capacity. For example, wider rules stored in this bank may be relocated to other banks using the method for adding rules to a TCAM.

20 Claims, 8 Drawing Sheets

INCREASING CAPACITY IN ROUTER FORWARDING TABLES

BACKGROUND

A Ternary Content Addressable Memory ("TCAM") is a type of computer memory used in certain high speed searching applications, such as routing information through a network. It is designed such that it receives a data word (e.g., a key in a packet header) and performs parallel matches of that word against every entry in the TCAM in a single clock cycle. Each TCAM entry can store a flow rule comprising a key, an action, and a priority.

TCAMs are often used in network routers. In many routers, the TCAMs may be organized into banks, each of which comprises a set of TCAM entries. The banks may have variable widths, where the width is inversely proportional to a capacity of the bank. For example, a bank may support 1000 entries of 72 bits, 512 entries of 144 bits, or 256 entries of 288 bits. An incoming packet is matched against all entries in all banks. If the packet matches multiple TCAM entries in a bank, the entry of lowest index (e.g., highest priority) is selected and its action is applied to the packet. If the packet matches multiple entries from multiple TCAM banks, the entry of lowest index in the bank of lowest index is selection and its action is applied to the packet.

TCAMs have been widely used in routers, switches, and network security appliances of high speed networks to implement packet flow rules, e.g., access control list ("ACL") call rules. They may be used for various applications, including packet filtering, forwarding, traffic load balancing and shaping.

SUMMARY

Aspects of the technology provide for increasing a capacity of TCAMs by clustering rules in TCAM banks.

One aspect of the technology provides a method for increasing capacity in a router forwarding table comprising a plurality of configurable banks. The method comprises providing a proposed rule to be added to the router forwarding table, identifying, using a processor, a range of candidate banks of the plurality of configurable banks in which the proposed rule may be stored based on a priority of the proposed rule, selecting, using the processor, one of the candidate banks for storing the proposed rule based on a width of the proposed rule and widths of the candidate banks, and storing the proposed rule in the selected bank. The selecting may be further based on an amount of available space in the candidate banks. Moreover, the width of one or more of the plurality of configurable banks may be dynamically changed (e.g., increased to accommodate the proposed rule). According to one aspect, the selecting one of the candidate banks may further comprise identifying a subset of the candidate banks having the same width as the proposed rule and having available space, comparing the candidate banks in the subset, and selecting the candidate bank having a least amount of available space. Alternatively, the selecting one of the candidate banks may further comprise comparing the widths of the candidate banks, identifying a subset of the candidate banks having a width greater than the width of the proposed rule, and selecting the narrowest bank in the subset of candidate banks.

A further aspect of this method may comprise removing a rule from a first bank of the plurality of configurable banks. If all rules remaining in the first bank have a smaller width than the removed rule, a width of the first bank may be reduced. If only some rules remaining in the first bank have a smaller width than the removed rule, a subset of rules that may be relocated may be identified, the subset including rules having a width greater than at least one other rule remaining in the bank. Further, attempts to relocate the subset of rules to one or more other banks may be made.

Another aspect of the technology provides a method for increasing capacity in a router forwarding table comprising a plurality of configurable banks. The method comprises removing a rule from a first bank. If all rules remaining in the first bank have a smaller width than the removed rule, a width of the first bank may be reduced. However, if only some rules remaining in the first bank have a smaller width than the removed rule, a subset of rules that may be relocated may be identified, the subset including rules having a width greater than at least one other rule remaining in the bank, and the subset of rules may be relocated to one or more other banks. The relocating may comprise identifying, using a processor, a range of candidate banks to which the rule may be relocated based on a priority of the rule, selecting, using the processor, one of the candidate banks for storing the rule based on a width of the rule and widths of the candidate banks, and storing the rule in the selected bank.

Yet another aspect of the technology provides a router, comprising a storage area storing a forwarding table comprising a plurality of configurable banks (e.g., ternary content addressable memory banks), an input adapted to receive a proposed rule to be added to the forwarding table, and a processor. The processor may be configured to identify a range of candidate banks in which the proposed rule may be stored based on a priority of the proposed rule, and select one of the candidate banks for storing the proposed rule based on a width of the proposed rule and widths of the candidate banks. The processor may be further configured to dynamically change the width of one or more of the plurality of configurable banks. Further, the processor may also be configured to identify a subset of the candidate banks having the same width as the proposed rule and having available space, compare the candidate banks in the subset, and select a given one of the candidate banks having a least amount of available space.

Another aspect of the invention provides a non-transitory computer-readable medium storing a computer-readable program for implementing a method of increasing capacity in a router forwarding table comprising a plurality of configurable banks. The method may comprise providing a proposed rule to be added to the router forwarding table, identifying, using a processor, a range of candidate banks of the plurality of configurable banks in which the proposed rule may be stored based on a priority of the proposed rule, selecting, using the processor, one of the candidate banks for storing the proposed rule based on a width of the proposed rule and widths of the candidate banks, and storing the proposed rule in the selected bank.

DETAILED DESCRIPTION

Figure 1:
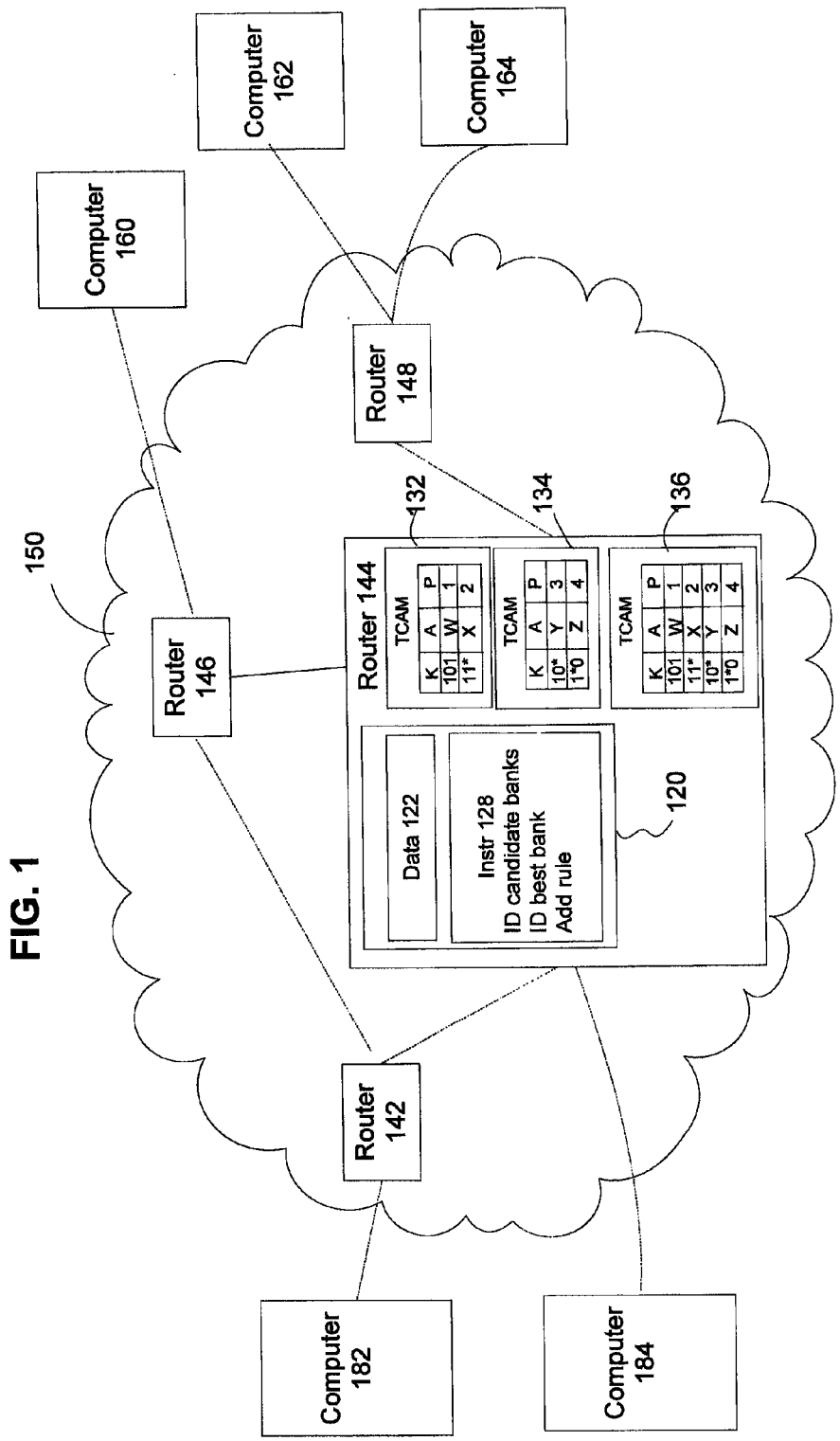
FIG. 1 is a diagram of an example system according to an aspect of this disclosure.

FIG. 1 illustrates an example network 150 that joins one or more client computers 160, 162, 164, 182, 184. The network 150 includes one or more routers 142, 144, 146, 148. Each router 142-148 may include one or more input ports for receiving data from other routers or computing devices, such as packets or program updates. Similarly, each router 142-148 may have one or more output ports for transmitting data through the network 150. Each router 142-148 may also include one or more packet forwarding tables, such as TCAM 132, TCAM 134, and TCAM 136 in the router 144. Further, each router may have a processor and a memory, such as memory 120 of the router 144, which stores data 122 and instructions 128 for adding ACL rules to the TCAMs 132-136. While TCAMs 132-136 are shown as being stored separately from memory 120, it should be understood that the TCAMs 132-136, data 122, and instructions 128 may all be stored in the same medium.

Memory 120 may be any of a variety of storage media, such as RAM, optical disc, magnetic storage, etc. While the memory 120 is shown as being integrated with the router 144, it should be understood that any type of memory, including a hard drive or removable memory, may be used. For example, the memory 120 may be a USB drive, or may be an independent storage medium coupled to one or more of the routers 142-148.

The computers 160, 162, 164, 182, 184 may be any of a variety of computing devices, including personal digital assistants (PDAs), laptops, tablet PCs, netbooks, PCs, etc. These devices may be connected to the network via a wired connection, such as through a modem, or wirelessly, such as through an access point in communication with one of the routers 142-148.

According to one aspect of this disclosure, the TCAMs 132-136 each represent a TCAM bank comprising a set of TCAM entries. A width of the entries in these TCAM banks may be configurable, and inversely proportional to a capacity of the bank. For example, a bank may support 1000 entries of 72 bits, 512 entries of 144 bits, or 256 entries of 288 bits. Each entry may store a flow rule. The rule includes a key (K), an action (A), and a priority (P). Each rule is stored as a TCAM entry in order of priority. For example, in TCAM 136, the rule corresponding to key 101 and action W has a highest priority (1). Conversely, the rule corresponding to key 1*0 and action Z has a lowest priority, 4. The rules may also be indexed according to priority. For example, highest priority rules may be stored at a lowest indexed entry.

As packets flow from, for example, computer 182 to computer 162, information in the packets is used to determine how the packet should be routed. For example, router 142 may use packet information to determine that the next hop should be router 144, and router 144 receives the packet and determines that the next hop should be router 148. One mechanism used by the routers (e.g., router 144) to make such determinations is the TCAMs 132-136. For example, the TCAMs 132-136 perform parallel matches of all stored rules against the header of an incoming packet.

In some circumstances, two or more rules overlap. For example, two rules overlap if a packet can match both of them. If multiple matches occur, the rule stored in the lowest indexed entry (the highest priority rule) is returned. Similarly, a packet may match multiple entries from multiple TCAM banks. In this instance, the entry of lowest index in the bank of lowest index is selected and its action is applied to the packet.

Figure 2:
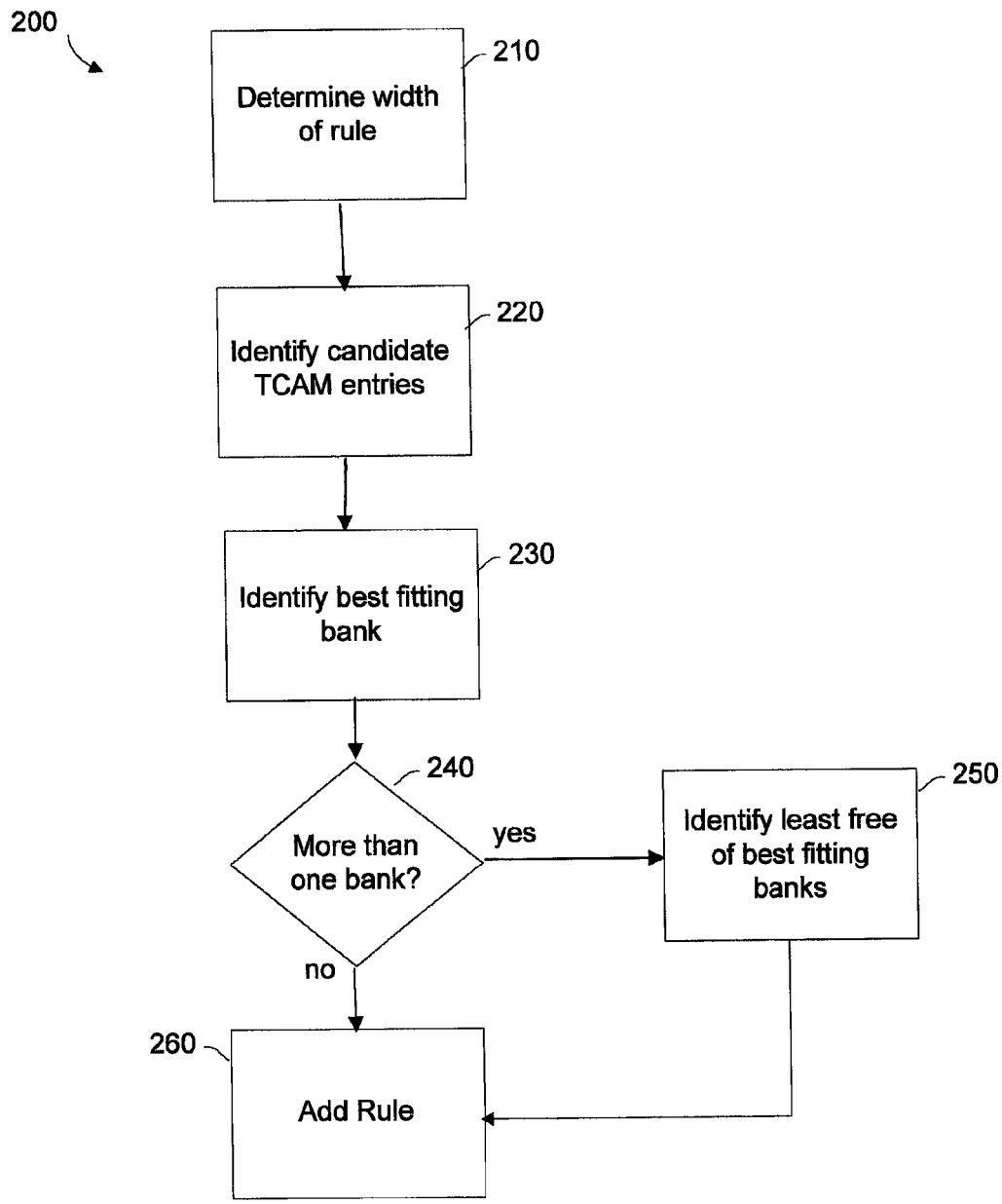
FIG. 2 illustrates an example method according to an aspect of this disclosure.

In order to maximize TCAM capacity, flow rules of similar sizes and programs may be grouped into the best fitting banks. In addition, TCAM banks may be dynamically configured to minimize their entry width, and therefore maximize capacity. An exemplary method 200 of grouping flow rules to maximize TCAM capacity is shown in FIG. 2. This method may determine a best fit for each rule in order to maximize TCAM capacity and therefore conserve resources. The method assumes a router with multiple TCAM banks. It should be understood that the steps of the following methods need not be performed in the precise order described below. Rather, various steps may be handled in a different order than what is shown or simultaneously, and steps may be added or omitted.

In stage 210, a width of a flow rule R to be included in the router is determined. For example, it may be determined that the rule R includes x bits.

In stage 220, candidate TCAM entries are identified. The candidate banks may include those having the same width as the rule R. Alternatively or additionally, the candidate banks may include those banks having the smallest width among all banks wider than rule R.

In stage 230, a best fitting TCAM bank is identified from the candidate banks. A method of identifying the best fitting bank is described in further detail below with respect to FIG. 6.

In some circumstances, more than one TCAM bank may be determined to be a best fit. For example, two TCAM banks having the same width as rule R may store the rule R without compromising a forwarding behavior of the table. If it is determined in stage 240 that more than one TCAM bank may be considered a best fit, a least free bank is identified from that group in stage 250. For example, if one of the two candidate banks having the same width as the rule R has 4 empty entries, and the other has 10 empty entries, the bank having 4 empty entries may be selected to store the rule R. This may serve to reduce fragmentation.

In stage 260, the rule R may be added to the TCAM identified as the best fit. According to some aspects, the width of the TCAM bank may be configured based on the added rule R.

Figure 3:
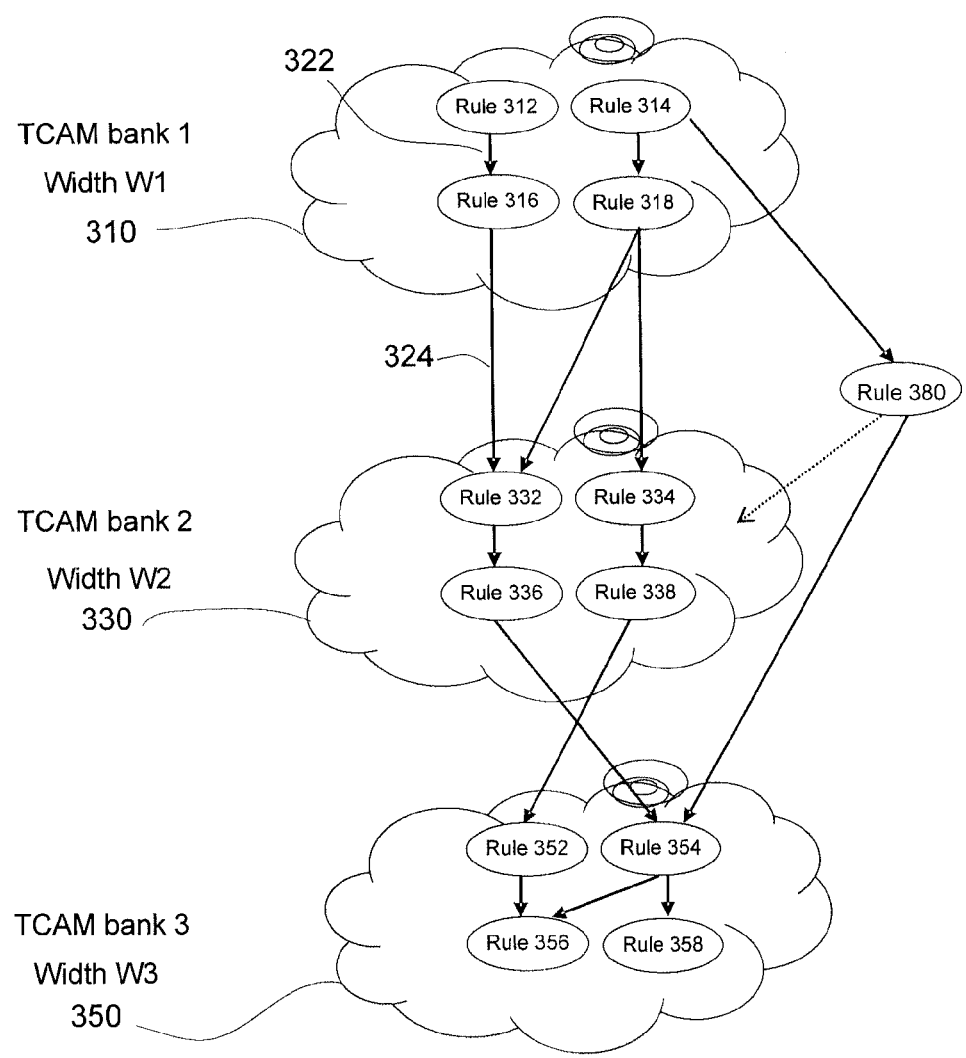
FIG. 3 illustrates an example of adding a rule to a TCAM according to an aspect of this disclosure.

FIG. 3 illustrates an example in accordance with the method 200 of FIG. 2. As shown in FIG. 3, three TCAM banks 310, 330, and 350 each store a set of rules. The TCAM banks may be organized by priority. For example, TCAM bank 310 may have a highest priority, followed by TCAM bank 330 and TCAM bank 350.

In this example, each set of rules is the same width. For example, in TCAM bank 310, rules 312, 314, 316, and 318 are each a first width W1. In TCAM bank 330, rules 332, 334, 336, and 338 are each a second width W2. Similarly, in TCAM bank 350, rules 352, 354, 356, and 358 are each a third width W3. The width of each TCAM bank 310-350 may be defined by the widest rule stored therein. Thus, bank 310 is width W1, bank 330 is width W2, and bank 350 is width W3. Each width W1, W2, and W3 may be a different width, but the TCAM banks 310-350 need not be organized by their relative widths.

In the example of FIG. 3, arrows are used to illustrate a relationship between the rules within each bank 310, 330, 350 and between banks. In particular, an arrow between two rules may denote that the first rule overlaps with the second and has a higher priority. For example, arrow 322 extends from rule 312 to rule 316, thus illustrating that rule 312 overlaps with rule 316 and has higher priority. Similarly, arrow 324 extends from rule 316 in TCAM bank 310 to rule 332 in TCAM bank 330, indicating that the rule 316 overlaps with the rule 332 and has higher priority.

In this example, rule 380 is a new rule to be added to one of the TCAM banks 310, 330, 350. The rule 380 has a width W2. However, the rule 380 could be stored in a TCAM bank of any width, for example, by increasing the width of narrower banks or by not utilizing the full width of the wider banks.

In terms of its relation to other rules, rule 312 in TCAM bank 310 overlaps rule 380 and has higher priority. The rule 380 overlaps rule 354 of the TCAM bank 350 and has higher priority. Therefore, the rule 380 may be stored in TCAM bank 310 below rule 314, in TCAM bank 350 above rule 354, or anywhere in TCAM bank 330. Accordingly, the candidate banks include each of banks 310-350.

The best fitting bank for the new rule 380 may be determined to be TCAM bank 330, for example, because of the respective widths of the bank 330 and the new rule 380. (See FIG. 6). Because this is the only best-fitting bank, the rule 380 may be added to the TCAM bank 330.

Figure 4:
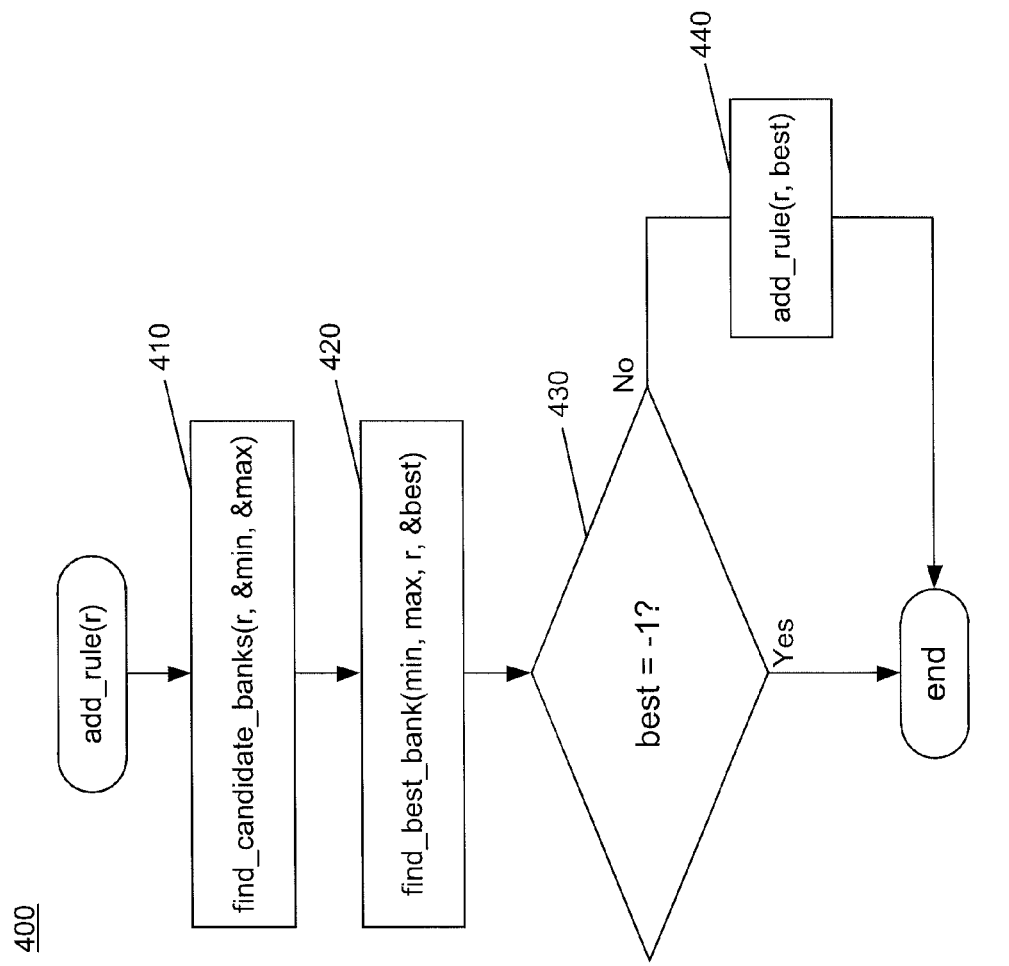
FIG. 4 illustrates an example method for adding a new rule to a router according to an aspect of this disclosure.
Figure 5:
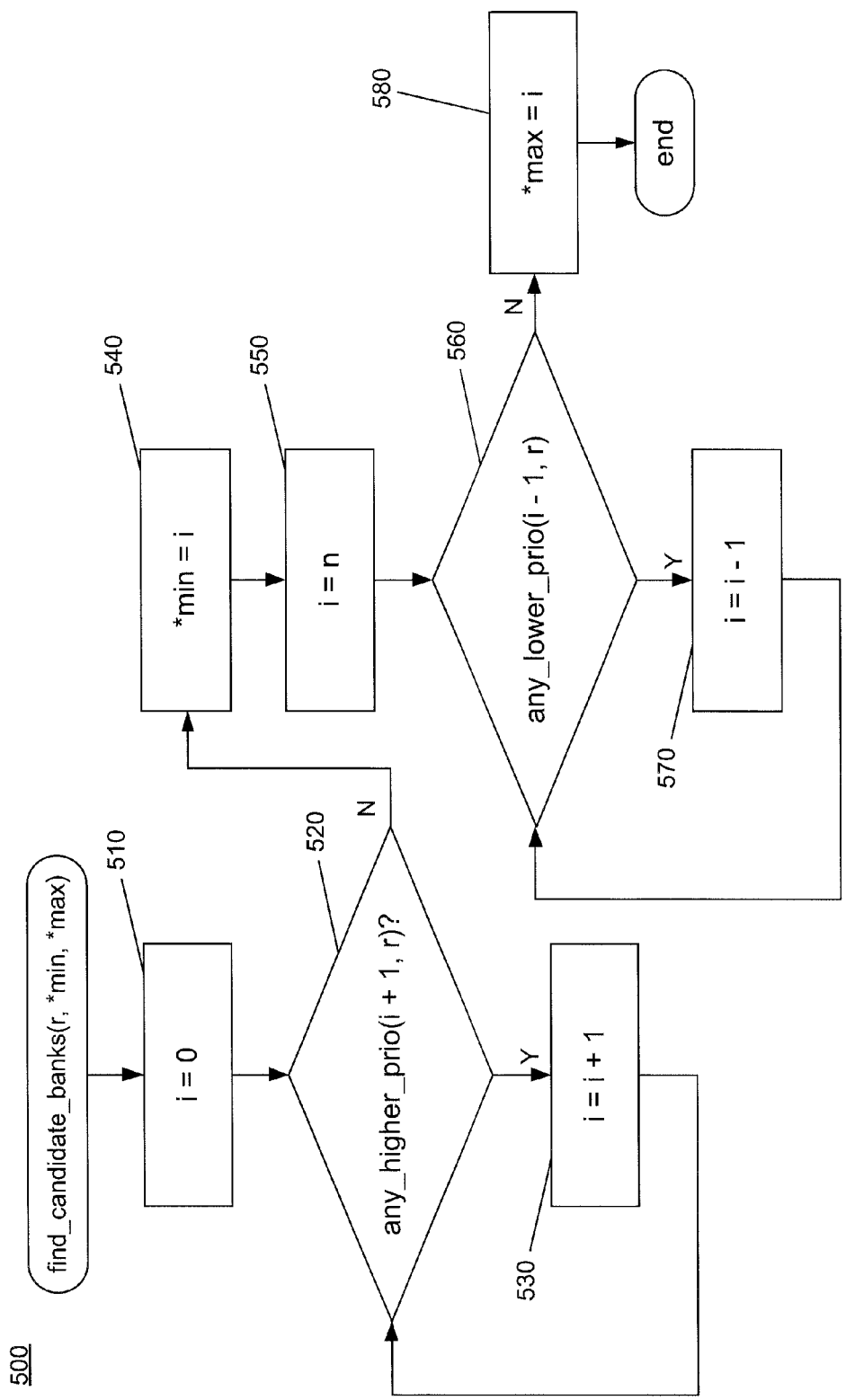
FIG. 5 illustrates an aspect of the method of FIG. 4 in greater detail.
Figure 6:
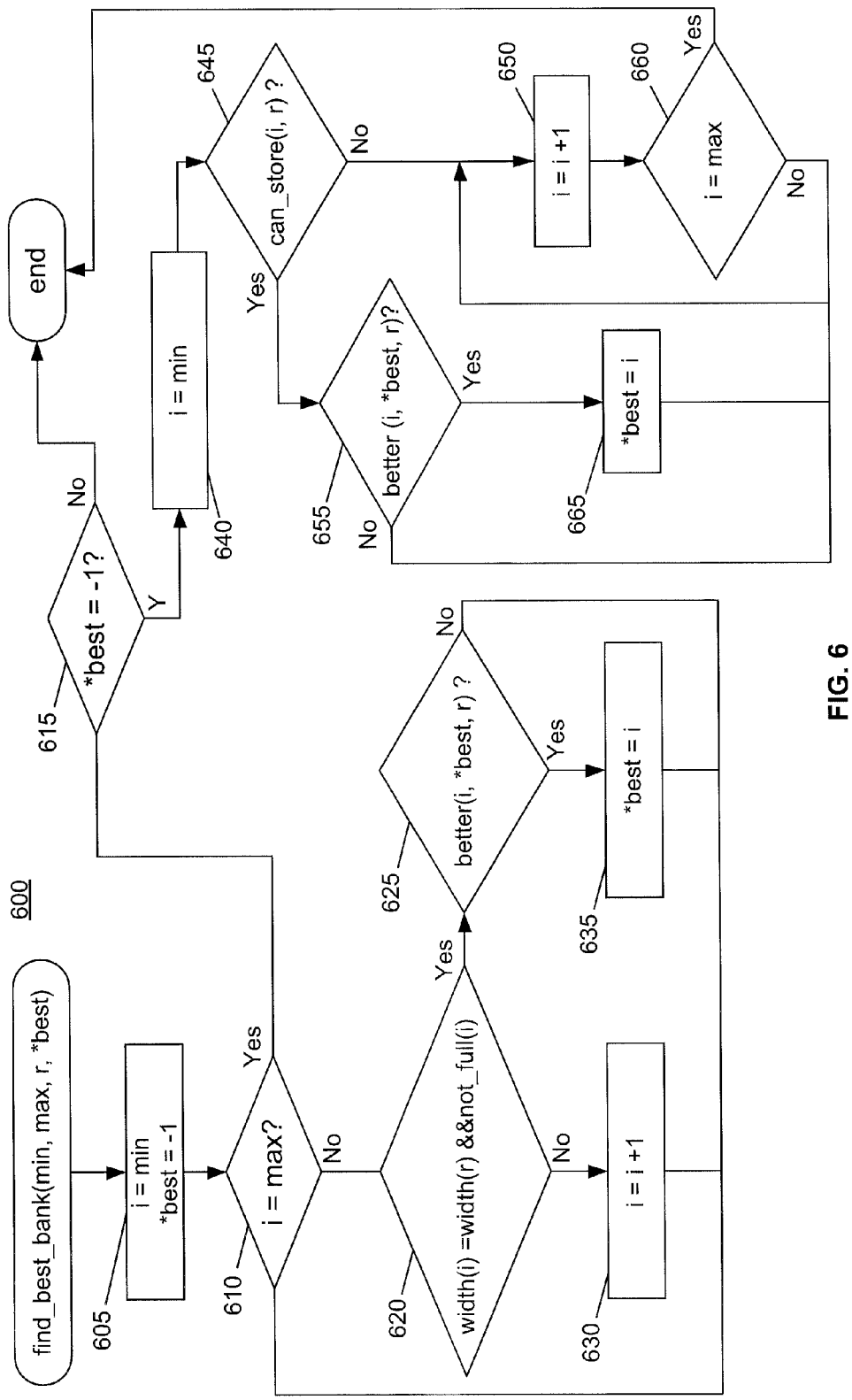
FIG. 6 illustrates another aspect of the method of FIG. 4 in greater detail.
Figure 7:
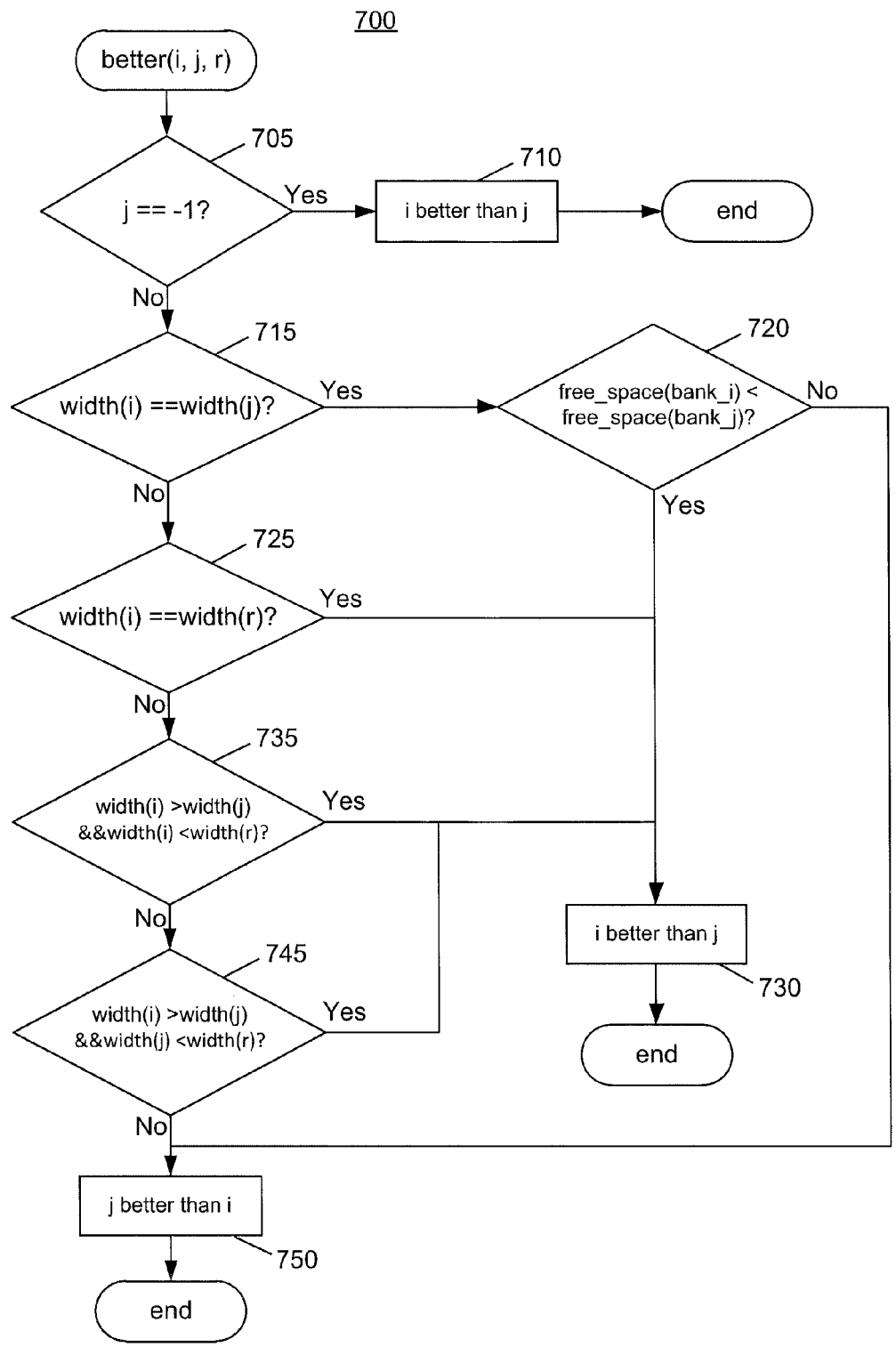
FIG. 7 illustrates an example method of comparing TCAM banks according to an aspect of this disclosure.

FIGS. 4-7 describe in detail a procedure for adding a rule to a TCAM to maximize capacity. Particularly, FIG. 4 describes a function add_rule(r), which adds a new rule r to a best-fitting TCAM bank. FIG. 5 describes a function find_candidate_banks(r, *min, *max), which identifies all possible TCAM banks in which the new rule r may be stored. FIG. 6 describes a function find_best_bank(min, max, r, *best), which determines the best bank in which to store the new rule r in order to maximize capacity. FIG. 7 describes a function better(i, j, r), which compares two banks identified as possible best banks, and determines which of those banks should be selected in order to reduce fragmentation. These functions may be performed any time a new rule is to be added.

FIG. 4 describes a method 400 of adding a new rule r to a packet forwarding table of a router. In particular, the method 400 utilizes the function add_rule(r). Here, candidate banks are identified in stage 410, for example, using function find_candidate_banks(r, &min, &max) (see FIG. 5). A best-fitting bank is identified in stage 420, for example, using function find_best_bank(min, max, r, &best) (See FIG. 6). A register "best" may store an index of the TCAM bank that is found to be the best candidate for storing the rule r. In stage 430, it is determined whether the register "best" is equal to −1, which may represent that TCAM banks are available for storing the rule r. For example, it may not be possible to add the rule r into any TCAM banks due to lack of space. If this is true, the method 400 ends. Otherwise, the rule r is added to the best fitting TCAM bank, for example, using function add_rule(r, best), in stage 440.

FIG. 5 illustrates a method 500 of finding candidate TCAM banks for the new rule r, for example, using function find_candidate_banks(r, *min, *max). According to one aspect, the method 500 identifies candidate bank by analyzing each TCAM bank on the router separately, and determining whether the new rule r may be stored therein.

In stage 510, a first bank is selected. According to this example, it may be assumed that the TCAM banks are organized in descending priority. Accordingly, a first selected TCAM bank may be the highest priority (lowest indexed) bank. A variable "i" corresponding to the selected bank is set to zero.

In stage 520, a next higher indexed (lower priority) TCAM bank than the selected TCAM bank is analyzed. In particular, it is determined whether any rule in the next higher indexed TCAM bank overlaps with the new rule r and has a higher priority than r. If so, the variable i is incremented to correspond to the next indexed TCAM bank in stage 530, and the method 500 returns to stage 520 where a TCAM bank indexed even higher than the previous TCAM bank is analyzed. However, if no higher priority rules overlap with the new rule r in the next higher indexed TCAM bank, then the selected TCAM bank is identified as the lowest indexed TCAM bank in which the new rule r may be stored (540).

In stage 550, a highest indexed (lowest priority) TCAM bank is selected. Accordingly, corresponding variable i is set to N. In stage 560 it is determined whether a next TCAM bank of lower index (higher priority) than the selected TCAM bank includes any rule overlapping with new rule r and having a lower priority than new rule r. If the next lower indexed TCAM bank includes such a rule, the variable i is decremented to correspond to that TCAM bank in stage 570, and the method 500 returns to stage 560 where a further lower indexed TCAM bank is analyzed. However, if no overlapping lower priority rules are identified in stage 560, the selected TCAM is set to be the highest indexed TCAM bank in which the rule r may be stored in stage 580.

Once the lowest and highest indexed TCAM banks that may store the new rule r are identified, each TCAM bank indexed between the highest and lowest may be considered a candidate for storing the new rule r.

FIG. 6 illustrates a method 600 for identifying the best bank for storing the new rule r. According to one aspect, this method may compare two banks at a time until all of the candidate banks are considered or until a best bank is found. For example, the method 600 may compare a lowest indexed candidate bank with each higher indexed candidate bank until the highest indexed candidate bank is considered. Attributes of a bank that may be considered best or better than other banks may include a similarity of width to the new rule r and a smaller amount of available free space in which to store the new r. According to some aspects, priority of the TCAM banks may also be considered.

In stage 605, two TCAM banks are selected for comparison. For example, the lowest indexed candidate bank and the next highest indexed bank may be selected. The variable *best stores the index of the TCAM bank considered as the best candidate for storing the rule r among banks "min" to i−1. The variable i represents the next TCAM bank to be compared against *best.

If TCAM bank i is considered as better than the TCAM bank *best, *best is changed to i. Otherwise, *best is not changed. In any case, *best now stores the index of TCAM bank considered as best among bank min to bank i. This repeats, until i is max, and *best stores the index of best TCAM among bank min to bank max. If *best=−1, it indicates that rule r cannot be inserted into any TCAM bank.

In stage 610, it is determined whether the selected candidate bank i is also the highest indexed candidate bank. For example, "i=max" indicates that i is the highest indexed TCAM bank that can store the rule. If it is determined in stage 610 that the selected candidate bank i is the highest indexed candidate bank, the method 600 proceeds to stage 615, where it is determined whether there exists a TCAM bank that is not full and has its width equal to the width of rule r. For example, *best=−1 means that there doesn't exist a TCAM bank that is not full and has its width equal to the width of rule r.

If it is determined that there exists a TCAM bank that is not full and has its width equal to that of rule r in stage 615, the method 600 ends, and the TCAM bank corresponding to *best may be considered the "best" TCAM bank for storing rule r and maximizing capacity of all TCAM banks on the router. However, if it is determined that *best=−1, indicating that there doesn't exist a TCAM bank that is not full and has its width equal to that of rule r, the method 600 continues to stage 640. At this point, a TCAM bank that has a different width from the width of rule r, but can store rule r, is sought. Accordingly, at stage 640 the TCAM bank of lowest index (min) is selected.

In stage 645, it is determined whether the TCAM corresponding to variable i is capable of storing the new rule r. For example, a function can_store(i, r) may be used. This function will return true if the current width of TCAM bank i is equal to or greater than that of the rule r, and if the TCAM bank i is not full. In this case, the TCAM bank i may store the new rule r without any modifications to the TCAM bank i. However, if the width of rule r is greater than the width of the TCAM bank I, the TCAM bank i would need to reduce its capacity in order to store the rule r. Specifically, the TCAM bank i would need to reduce its capacity by a ratio of the width of the TCAM bank over the width of the new rule r ($W_i/W_r$) to increase its width from $W_i$ to $W_r$. However, the TCAM bank i may increase its width in this way to store the new rule r if it has sufficient capacity to do so. For example, the narrower TCAM bank i may store the wider rule r if it is currently less than $1-[1+\text{capacity}(W_i)]W_i/W_r$ full, where capacity ($W_i$) is its current capacity given width of $W_i$.

If it is determined in stage 645 that the TCAM bank i is incapable of storing the new rule r, a next TCAM bank is selected for consideration in stage 650. It is determined in stage 660 whether among all banks of index in between min and max, no bank have space to store rule r.

However, if it is determined in stage 645 that the TCAM i can store the new rule r, the method 600 proceeds to stage 655, where it is determined whether the TCAM bank i is better suited to store the rule r than the TCAM bank currently considered as the potential best. For example, the better TCAM bank may be calculated using the method 700 of FIG. 7. If it is determined that the TCAM bank i is better, it is saved as the new potential best TCAM in stage 665. Otherwise, the method 600 returns to stage 650 where a new TCAM bank (i+1) is selected for consideration.

In stage 620, it is determined whether the width of bank i is the same as the width of the new rule r, and whether the bank i has any empty entries in which to store rule r. If both of these conditions are true, it is determined in stage 625 which of the two TCAM banks corresponding to "i" and "*best" (e.g., the lowest indexed bank and the next highest indexed bank in the first iteration) is "better." This determination is explained in more detail below with respect to FIG. 7.

If it is determined in stage 625 that the TCAM bank corresponding to "i" is better than the possible best TCAM bank (*best), the TCAM bank i will be saved as the new possible best (*best) in stage 635 for comparison to other TCAM banks. Otherwise, the method 600 returns directly to stage 610.

FIG. 7 illustrates a method 700 for determining the better of two banks, denoted as i and j. In stage 705, it is determined whether j is not a valid TCAM bank. If it is determined that j is not a valid TCAM bank in stage 705, it may be decided that bank i is better than bank j in stage 710. However, if j is a valid TCAM bank the method proceeds to stage 715, where it is determined whether bank i and bank j have a same width.

If banks i and j are each the same width, other factors may be considered to determine which bank is better suited to store the new rule r. For example, according to the method 700, if the widths of banks i and j are the same, the method 700 proceeds to stage 720, where it is determined whether the bank i includes less free space than the bank j. If bank i is determined to include less free space, it will be considered the "better" bank for storing the new rule r in stage 730. Conversely, if bank i does not include less free space, bank j will be considered the "better" bank in stage 750. The bank having less free space is considered to be the "better" choice because storing the new rule in that bank may help to reduce fragmentation.

If banks i and j are not determined to be the same width in stage 715, it is determined whether the width of bank i is equivalent to the width of the new rule r in stage 725. If bank i is the same width as rule r, then bank i may be considered the "better" choice.

However, if bank i is not the same width as the rule r, the method 700 proceeds to stage 735. In this stage, it is determined whether the width of the bank i is greater than the width of bank j and also less than the width of rule r. Similarly, in stage 745 it is determined whether the width of the bank j is less than the width of the bank i and also less than the width of the rule r. If either of these are true, bank i will be determined to be "better" than bank j (730). However, if they are both false, it will be determined that bank j is "better" (750).

Figure 8:
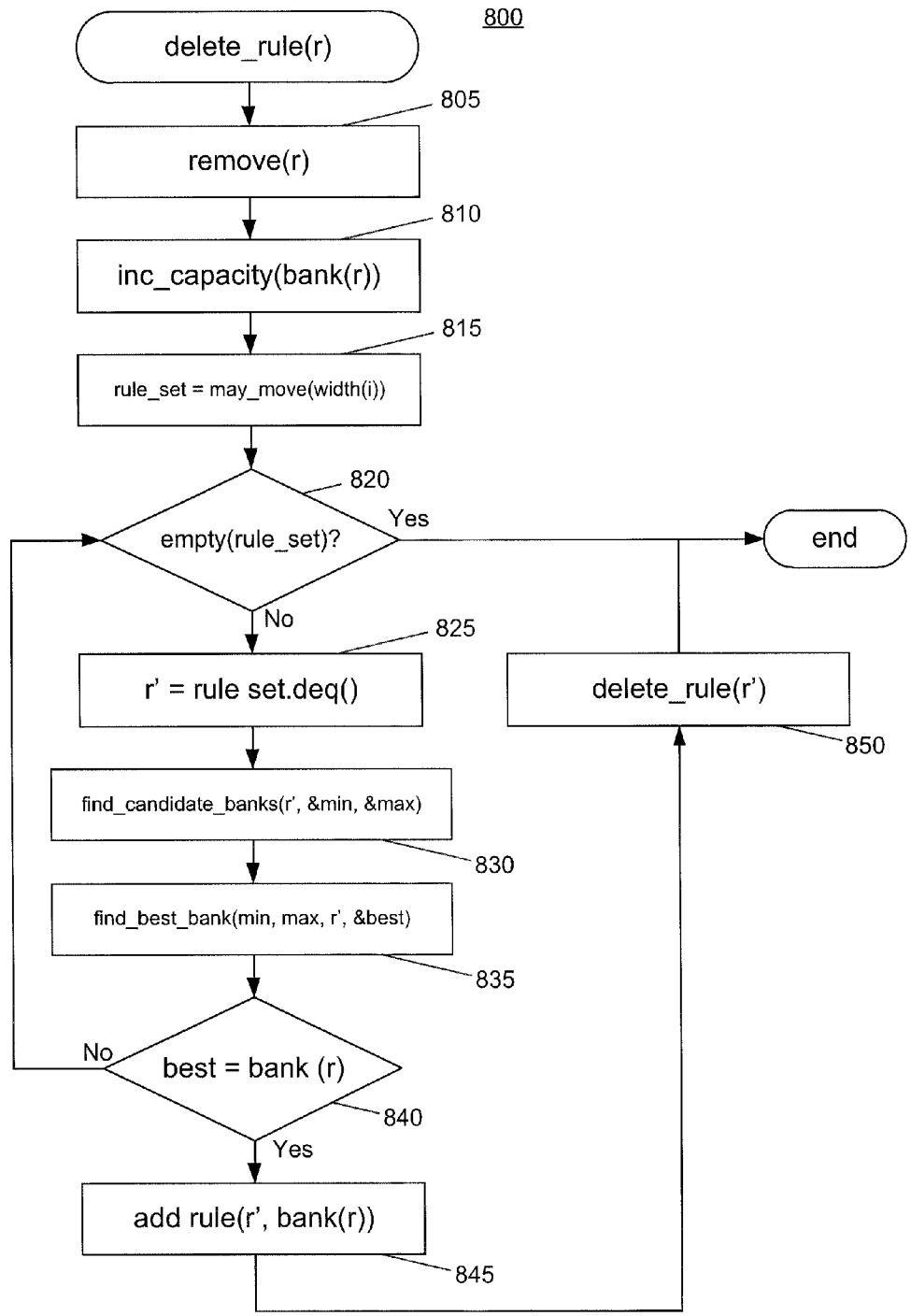
FIG. 8 illustrates an example method for deleting a rule from the router according to an aspect of this disclosure.

FIG. 8 describes a function delete_rule(r), which deletes a rule r from a TCAM bank in such a way as to maintain forwarding behavior of the remaining rules and efficiently use the TCAM banks (e.g., maximize capacity). For example, to delete a rule, the system and method of the present disclosure first try to increase the capacity of the bank from which the rule was removed by reducing its width, if all remaining rules have smaller width. Further, one or more rules in that TCAM bank may be relocated to other banks to enable a reduction of the TCAM banks width and/or to reduce fragmentation of all the TCAM banks. This method 800 may be performed any time a rule is to be deleted from a router forwarding table.

In stage 805, rule r is removed from its respective TCAM bank. In stage 810, a capacity of the TCAM bank from which the rule was removed is increased, if possible. For example, if the removed rule r was the widest rule in the bank, a width of the bank may be reduced while still accommodating the rules stored therein. The reduced width may result in an increased capacity.

The width of the bank from which the rule r was removed may also be reduced by moving wider rules stored therein to better fitting TCAM banks. Accordingly, in stage 815 the rules that may be moved in order to reduce the width of the TCAM are selected and defined as "rule_set."

In stage 820, it is determined whether the rule set comprising the selected rules in empty. If so, there are no rules to possibly move in order to reduce the width of the TCAM bank, and the method 800 is ended. However, if the rule set is not empty, a first rule r' is selected from the set in stage 825.

In stages 830 and 835, an attempt is made to move the selected rule r' to a "best" bank. For example, this operation may be similar to stages 410 and 420 described above with respect to FIG. 4. In stage 840, it is determined whether the best bank identified in stage 835 is better than the bank in which the rule r' is currently stored. If so, the rule r' is added to the best bank (845) and removed from its previous storage location (850). Otherwise, the method 800 returns to stage 820 to determine whether there are any further rules that may possibly be moved to reduce the width of the TCAM.

The above described methods may be implemented as software (e.g., executable code stored in memory 120) and executed by a processor in the router. Alternatively, the software may be stored remotely. This software application may be automatically run each time a flow rule is to be added to or removed from the router.

The above-described methods may produce a significant cost savings. Particularly, less hardware resources may be consumed, because the TCAMs are used more efficiently.

Further, because the width and capacity of each TCAM bank may be automatically configured, updating of the router to add or delete rules may be done quickly and efficiently.

Although the subject matter of the present disclosure has been described with reference to particular embodiments, it should be understood that these examples are merely illustrative of the principles and applications of the present disclosure. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative embodiments. For example, the stages taken to derive the lowest cost number of moves within the TCAM may be modified. However, these and that other arrangements may be devised without departing from the spirit and scope of the present invention as defined by the appended claims.

The invention claimed is:

1. A method for increasing capacity in a router forwarding table comprising a plurality of configurable banks, the method comprising:
   providing a proposed rule to be added to the router forwarding table;
   identifying, using one or more processors, a range of candidate banks of the plurality of configurable banks that are available to store the proposed rule based on a priority of the proposed rule;
   selecting, using the one or more processors, one of the candidate banks for storing the proposed rule based on a width of the proposed rule and widths of the candidate banks; and
   storing the proposed rule in the selected bank.

2. The method of claim 1, wherein the selecting is further based on an amount of available space in the candidate banks.

3. The method of claim 1, further comprising dynamically changing the width of one or more of the plurality of configurable banks.

4. The method of claim 3, wherein dynamically changing the width further comprises increasing the width of the selected bank to accommodate the proposed rule.

5. The method of claim 1, wherein the selecting one of the candidate banks further comprises:
   identifying a subset of the candidate banks having the same width as the proposed rule and having available space;
   comparing the candidate banks in the subset; and
   selecting the candidate bank having a least amount of available space.

6. The method of claim 1, wherein the selecting one of the candidate banks further comprises:
   comparing the widths of the candidate banks;
   identifying a subset of the candidate banks having a width greater than the width of the proposed rule; and
   selecting the narrowest bank in the subset of candidate banks.

7. The method of claim 1, further comprising:
   removing a rule from a first bank of the plurality of configurable banks;
   if all rules remaining in the first bank have a smaller width than the removed rule, reducing a width of the first bank; and
   if only some rules remaining in the first bank have a smaller width than the removed rule:
      identifying a subset of rules that may be relocated, the subset including rules having a width greater than at least one other rule remaining in the bank; and
      attempting to relocate the subset of rules to one or more other banks.

8. A method for increasing capacity in a router forwarding table comprising a plurality of configurable banks, the method comprising:
   removing a rule from a first bank;
   if all rules remaining in the first bank after the removing have a width smaller than a width of the removed rule, reducing a width of the first bank; and
   if only some rules remaining in the first bank after the removing have a width smaller than the width of the removed rule:
      identifying a subset of rules in the first bank that may be relocated, the subset including rules having a width greater than a width of at least one other rule remaining in the bank; and
      attempting to relocate the subset of rules to one or more other banks.

9. The method of claim 8, further comprising attempting to relocate all rules remaining in the first bank.

10. The method of claim 8, wherein relocating comprises:
    identifying, using a processor, a range of candidate banks to which the rule may be relocated based on a priority of the rule;
    selecting, using the processor, one of the candidate banks for storing the rule based on a width of the rule and widths of the candidate banks; and
    storing the rule in the selected bank.

11. A router, comprising:
    a storage area storing a forwarding table comprising a plurality of configurable banks;
    an input adapted to receive a proposed rule to be added to the forwarding table; and
    a processor programmed to:
       identify a range of candidate banks that are available to store the proposed rule based on a priority of the proposed rule; and
       select one of the candidate banks for storing the proposed rule based on a width of the proposed rule and widths of the candidate banks.

12. The router of claim 11, wherein the processor is further programmed to dynamically change the width of one or more of the plurality of configurable banks.

13. The router of claim 12, wherein the configurable banks are ternary content addressable memory banks.

14. The router of claim 12, wherein the processor is further programmed to:
    identify a subset of the candidate banks having the same width as the proposed rule and having available space;
    compare the candidate banks in the subset; and
    select a given one of the candidate banks having a least amount of available space.

15. The router of claim 12, wherein the processor selecting one of the candidate banks is further programmed to:
    compare the widths of the candidate banks;
    identify a subset of the candidate banks having a width greater than the width of the proposed rule; and
    select the narrowest bank in the subset of candidate banks.

16. The router of claim 12, wherein the processor is further programmed to:
    remove a rule from a first bank of the plurality of configurable banks;
    if all rules remaining in the first bank have a smaller width than a width of the removed rule, reduce a width of the first bank; and
    if only some rules remaining in the first bank have a smaller width than the width of the removed rule:

identify a subset of rules in the first bank that may be relocated, the subset including rules having a width greater than a width of at least one other rule remaining in the bank; and attempt to relocate the subset of rules to one or more other banks.

17. The router of claim 16, wherein the attempt to relocate the subset of rules to one or more other banks further comprises:

identifying a range of candidate banks available to store at least one subset rule of the subset of rules based on a priority of the subset rule;

selecting one of the candidate banks for storing the subset rule based on a width of the subset rule and widths of the candidate banks; and storing the subset rule in the selected bank.

18. A non-transitory computer-readable medium storing a computer-readable program for implementing a method of increasing capacity in a router forwarding table comprising a plurality of configurable banks, the method comprising:

providing a proposed rule to be added to the router forwarding table;

identifying, using a processor, a range of candidate banks of the plurality of configurable banks available to store the proposed rule based on a priority of the proposed rule;

selecting, using the processor, one of the candidate banks for storing the proposed rule based on a width of the proposed rule and widths of the candidate banks; and storing the proposed rule in the selected bank.

19. The non-transitory computer-readable medium of claim 18, wherein the method further comprises:

dynamically changing the width of one or more of the plurality of configurable banks.

20. The non-transitory computer-readable medium of claim 18, wherein the method further comprises:

removing a rule from a first bank of the plurality of configurable banks;

if all rules remaining in the first bank have a smaller width than a width of the removed rule, reducing a width of the first bank; and if only some rules remaining in the first bank have a smaller width than the width of the removed rule:

identifying a subset of rules in the first bank that may be relocated, the subset including rules having a width greater than a width of at least one other rule remaining in the bank; and attempting to relocate the subset of rules to one or more other banks.

* * * * *